United States Patent
Wang et al.

(10) Patent No.: US 10,875,410 B2
(45) Date of Patent: *Dec. 29, 2020

(54) AUTOMOBILE CHARGER

(71) Applicant: Pilot Inc., City of Industry, CA (US)

(72) Inventors: Calvin Shiening Wang, City of Industry, CA (US); Chung-Hsin Wang, Shenzhen (CN)

(73) Assignee: Pilot Inc., City of Industry, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,321

(22) Filed: May 6, 2019

(65) Prior Publication Data

US 2019/0329662 A1    Oct. 31, 2019

Related U.S. Application Data

(63) Continuation of application No. 15/923,219, filed on Mar. 16, 2018, now Pat. No. 10,328,806, which is a
(Continued)

(30) Foreign Application Priority Data

Apr. 28, 2014    (CN) ...................... 2014 2 0212173 U

(51) Int. Cl.
*B60L 53/00*    (2019.01)
*H02J 7/00*    (2006.01)
(Continued)

(52) U.S. Cl.
CPC .............. *B60L 53/00* (2019.02); *B60L 53/53* (2019.02); *H02J 7/0034* (2013.01);
(Continued)

(58) Field of Classification Search
CPC ......... B60L 53/00; H02J 7/0068; H02J 9/005; H02J 7/0065; H02J 7/0029; H02J 7/0034
(Continued)

(56) References Cited

U.S. PATENT DOCUMENTS 3,343,057 A    9/1967    Smith
3,590,357 A    6/1971    Reid
(Continued)

FOREIGN PATENT DOCUMENTS

AU    694452    7/1998
CN    201947042    8/2011
(Continued)

OTHER PUBLICATIONS

Pilot, Inc. v. WinPlus North America, Inc. Civil Docket for Case#: 1:17-cv-01183-STV, dated Sep. 18, 2019, 2 pages.
(Continued)

*Primary Examiner* — Sun J Lin
(74) *Attorney, Agent, or Firm* — Sheridan Ross P.C.

(57) ABSTRACT

A novel automobile charger comprises a direct current (DC) voltage supply, wherein a positive pole of the DC voltage supply is connected with a first end or a first lead of a DC-to-DC module, a first end of a battery voltage detection module and a first end of a load module simultaneously, while a negative pole of the DC voltage supply is connected with a second end of the DC-to-DC module, a first end of a microcontroller, a first end of an automobile start control module and a second end of the battery voltage detection module simultaneously. A third end of the DC-to-DC module is connected with a second end of the microcontroller. A first end, a fourth end, and a fifth end of the microcontroller are connected with a third end of the battery voltage detection module, a second end of the automobile start control module and a first end of a load detection module respectively. A second end of the load detection module is connected with a third end of the automobile start control module and a second end of the load module simultaneously.

20 Claims, 2 Drawing Sheets

Related U.S. Application Data continuation of application No. 15/355,409, filed on Nov. 18, 2016, now Pat. No. 10,046,653, which is a continuation of application No. 14/569,352, filed on Dec. 12, 2014, now Pat. No. 9,525,297.

(51) Int. Cl.
*B60L 53/53* (2019.01)
*H02J 9/00* (2006.01)

(52) U.S. Cl.
CPC .......... *H02J 7/0068* (2013.01); *H02J 7/0029* (2013.01); *H02J 9/005* (2013.01); *H02J 2207/20* (2020.01)

(58) Field of Classification Search
USPC ....................................................... 320/109
See application file for complete search history.

(56) References Cited

U.S. PATENT DOCUMENTS

| | | |
|---|---|---|
| 3,950,668 A | 4/1976 | Sancey et al. |
| 5,319,298 A | 6/1994 | Wanzong et al. |
| 5,487,002 A | 1/1996 | Diller et al. |
| 5,793,185 A | 8/1998 | Prelec |
| 5,831,350 A | 11/1998 | McConkey et al. |
| 6,057,667 A | 5/2000 | Mills |
| 6,130,519 A | 10/2000 | Whiting et al. |
| 6,144,110 A | 11/2000 | Matsuda et al. |
| 6,160,381 A | 12/2000 | Peterzell |
| 6,212,054 B1 | 4/2001 | Chan |
| 6,249,106 B1 | 6/2001 | Turner et al. |
| 6,262,492 B1 | 7/2001 | Sheng |
| 6,271,605 B1 | 8/2001 | Carkner et al. |
| 6,344,733 B1 | 2/2002 | Crass et al. |
| 6,351,102 B1 | 2/2002 | Troy |
| 6,362,599 B1 | 3/2002 | Turner et al. |
| 6,426,606 B1 | 7/2002 | Purkey |
| 6,632,103 B1 | 10/2003 | Liu |
| 6,774,607 B2 | 8/2004 | Moseneder et al. |
| 6,803,743 B2 | 10/2004 | George et al. |
| 6,919,704 B1 | 7/2005 | Healey |
| 7,199,555 B2 | 4/2007 | Hung |
| 7,339,347 B2 | 3/2008 | Elder et al. |
| 7,345,450 B2 | 3/2008 | Krieger et al. |
| 7,508,171 B2 | 3/2009 | Carrier et al. |
| 7,579,811 B2 | 8/2009 | Sato et al. |
| 7,675,261 B2 | 3/2010 | Elder et al. |
| 8,072,900 B2 | 12/2011 | Brown |
| 8,125,181 B2 | 2/2012 | Gregg et al. |
| 8,172,603 B1 | 5/2012 | Richardet, Jr. |
| 8,183,821 B2 | 5/2012 | Sakurai |
| 8,253,376 B2 | 8/2012 | Gale et al. |
| 8,447,543 B2 | 5/2013 | Dickinson et al. |
| 8,565,930 B2 | 10/2013 | Miwa |
| 8,692,513 B2 | 4/2014 | Gaul et al. |
| 8,723,477 B2 | 5/2014 | Gaul et al. |
| 8,994,327 B2 | 3/2015 | Kusch et al. |
| 9,007,015 B1 | 4/2015 | Nook et al. |
| 9,007,023 B2 | 4/2015 | Dao |
| 9,248,746 B2 | 2/2016 | Wen |
| 9,263,717 B2 | 2/2016 | Nakano et al. |
| 9,263,907 B2 | 2/2016 | Richardson et al. |
| 9,287,725 B2 | 3/2016 | Huffman et al. |
| 9,333,865 B2 | 5/2016 | Kawasaki et al. |
| 9,352,652 B2 | 5/2016 | Cavazos et al. |
| 9,412,994 B2 | 8/2016 | Koebler |
| 9,496,728 B2 | 11/2016 | Lei |
| 9,506,446 B2 | 11/2016 | Xinfang |
| 9,525,297 B2 | 12/2016 | Wang |
| 9,871,392 B2 | 1/2018 | Durando et al. |
| 9,874,611 B2 | 1/2018 | Whiting et al. |
| 9,954,391 B2 | 4/2018 | Lei |
| 1,004,665 A1 | 8/2018 | Wang et al. |
| 1,032,880 A1 | 6/2019 | Wang |
| 2001/0038276 A1 | 11/2001 | Resch et al. |
| 2002/0075003 A1 | 6/2002 | Fridman et al. |
| 2003/0096158 A1 | 5/2003 | Takano et al. |
| 2004/0066168 A1 | 4/2004 | George et al. |
| 2005/0110467 A1 | 5/2005 | Thomason |
| 2005/0162124 A1 | 7/2005 | Bertness et al. |
| 2009/0008374 A1 | 1/2009 | Fosbinder |
| 2009/0174362 A1 | 7/2009 | Richardson et al. |
| 2010/0013302 A1 | 1/2010 | Howell et al. |
| 2010/0055546 A1 | 3/2010 | Elder et al. |
| 2010/0173182 A1 | 7/2010 | Baxter et al. |
| 2010/0181959 A1 | 7/2010 | Gibbs et al. |
| 2010/0244766 A1 | 9/2010 | Olsberg |
| 2010/0301800 A1 | 12/2010 | Inskeep |
| 2011/0127947 A1 | 6/2011 | Hunter et al. |
| 2011/0279089 A1 | 11/2011 | Yeo |
| 2012/0013189 A1 | 1/2012 | Jenkins |
| 2012/0025763 A1 | 2/2012 | Hsiao et al. |
| 2012/0068662 A1 | 3/2012 | Durando et al. |
| 2012/0139498 A1 | 6/2012 | Chang |
| 2013/0015814 A1 | 1/2013 | Kelty et al. |
| 2013/0241488 A1 | 9/2013 | Dao |
| 2014/0159509 A1 | 6/2014 | Inskeep |
| 2015/0012174 A1 | 1/2015 | Kim et al. |
| 2015/0032312 A1 | 1/2015 | Lambrinos et al. |
| 2015/0212135 A1 | 7/2015 | Jin et al. |

FOREIGN PATENT DOCUMENTS

| | | |
|---|---|---|
| CN | 103066662 | 4/2013 |
| CN | 203522157 | 4/2014 |
| DE | 202013102599 | 8/2013 |
| EP | 1673828 | 5/2013 |
| JP | 2015-115979 | 6/2015 |
| WO | WO 2000/024108 | 4/2000 |
| WO | WO 2012/080996 | 6/2012 |

OTHER PUBLICATIONS

*Pilot, Inc.* v. *Anker Technology Corporation*, Civil Docket for Case #: 1:17-cv-01185-CBS, dated Sep. 18, 2019, 2 pages.
*Pilot, Inc.* v. *Schumacher Electric Corporation*, Answer Exhibits for Case #: 1:19-cv-05982, dated Sep. 23, 2019, 456 pages.
*Pilot, Inc.* v. *Schumacher Electric Corporation*, Complaint with Exhibits for Case #: 1:19-cv-05982, dated Sep. 6, 2019, 523 pages.
*Pilot, Inc.* v. *Schumacher Electric Corporation*, Docket Report for Case #: 1:19-cv-5982, dated Sep. 18, 2019, 2 pages.
*Pilot, Inc.* v. *Schumacher Electric Corporation*, Plaintiff's Motion to Dismiss Counterclaim for Case #: 1:19-cv-05982-EEC, dated Oct. 7, 2019, 14 pages.
*Pilot, Inc.* v. *Schumacher Electric Corporation*, Schumacher's Answer for Case #: 1:19-cv-05982-EEC, dated Sep. 23, 2019, 84 pages.
*Pilot, Inc.* v. *Anker Technology Corporation*, Complaint for Case #: 4:17-cv-04918-JST, dated Aug. 23, 2017, 14 pages.
*Pilot, Inc.* v. *Anker Technology Corporation*, Docket Report for Case #: 4:17-cv-4918, dated Sep. 18, 2019, 5 pages.
*Pilot, Inc.* v. *Anker Technology Corporation, Anker North America, LLC and Hunan Oceanwing E-Commerce Co., Ltd.*, First Amended Complaint for Patent Infringement and Jury Demand for Case #: 4:17-cv-04918-JST, dated Nov. 23, 2017, 19 pages.
*Pilot, Inc.* v. *Winplus North America, Inc.* Answer to First Amended Complaint for Patent Infringement and Affirmative Defenses to Pilot, Inc. for Case #: 5:17-cv-01712-GW-MRW, dated Nov. 17, 2017, 9 pages.
*Pilot, Inc.* v. *Winplus North America, Inc.*, Complaint for Patent Infringement and Jury Demand for Case #: 5:17-cv-01712-GW-MRW, dated Aug. 23, 2017, 14 pages.
Declaration in Support of Motion to Stay Exhibit 3, for Case #: 5:17-cv-01712-GW-MRW, dated Aug. 22, 2018, 11 pages.
Declaration in Support of Motion to Stay Exhibit 4, for Case #: 5:17-cv-01712-GW-MRW, dated Aug. 22, 2018, 17 pages.
Declaration in Support of Motion to Stay Exhibit 8, for Case #: 5:17-cv-01712-GW-MRW, dated Aug. 22, 2018, 24 pages.

(56) References Cited

OTHER PUBLICATIONS

*Pilot, Inc.* v. *Winplus North America, Inc.*, Declaration of David F. Kowalski in Support of Winplus North America, Inc.'s Motion to Stay Pending Inter Partes Review for Case #: 5:17-cv-01712-GW-MRW, dated Aug. 28, 2018, 5 pages.
*Pilot, Inc.* v. *Winplus North America Inc.*, Declaration of Brandon C. Fernald in Support of Pilot, Inc.'s, Motion for Leave to File Second Amended Complaint for Case #: 5:17-cv-01712-GW-MRW, dated Aug. 30, 2018, 76 pages.
*Pilot, Inc.* v. *Winplus North America, Inc.*, Docket Report for Case #: 5:17-cv-1712, dated Sep. 18, 2019, 7 pages.
*Pilot, Inc.* v. *Winplus North America, Inc.*, First Amended Complaint for Patent Infringement for Case #: 5:17-cv-01712-GW-MRW, dated Oct. 31, 2017, 17 pages.
*Pilot, Inc.* v. *Winplus North America, Inc.*, Plaintiff Pilot, Inc.'s Memorandum in Support of its Motion for Leave to Amend First Amended Complaint for Patent Infringement for Case #: 5:17-cv-01712-GW-MRW, dated Aug. 30, 2018, 11 pages.
*Pilot, Inc.* v. *Winplus North America, Inc.*, Defendant Winplus North America, Inc.'s Memorandum in Support of Motion to Stay Pending Inter Partes Review for Case #: 5:17-cv-01712-GW-MRW, dated Aug. 22, 2018, 17 pages.
*Pilot, Inc.* v. *Winplus North America, Inc.*, Defendant Winplus North America, Inc.'s Notice of Filing of Petition for Inter Partes Review of Patent-In-Suit for Case #: 5:17-cv-01712-GW-MRW, dated Jan. 22, 2018, 10 pages.
*Pilot, Inc.* v. *Winplus North America, Inc.*, Defendant Winplus North America, Inc.'s Notice of Motion to Stay Pending Inter Partes Review for Case #: 5:17-cv-01712-GW-MRW, dated Aug. 22, 2018, 3 pages.
Exhibits I.A-I.C for *Pilot, Inc.* v. *Schumacher Electric Corporation*, Defendant Schumacher Electric Corporation's Corrected Initial Noninfringement, Invalidity and Unenforceability Contentions Pursuant to Local Patent Rule (LPR) 2.3 for Case # 1:19-cv-05982-EEC, dated Nov. 25, 2019, 70 pages.
Exhibit II.A, Invalidity Claim Chart for Schumacher SL1 System for *Pilot, Inc.* v. *Schumacher Electric Corporation*, Defendant Schumacher Electric Corporation's Corrected Initial Noninfringement, Invalidity and unenforceability Contentions Pursuant to Local Patent Rule (LPR) 2.3 for Case # 1:19-cv-05982-EEC, dated Nov. 25, 2019, 29 pages.
Exhibit II.B, Invalidity Claim Chart for HaiJiu SHF12000-12 for *Pilot, Inc.* v. *Schumacher Electric Corporation*, Defendant Schumacher Electric Corporation's Corrected Initial Noninfringement, Invalidity and unenforceability Contentions Pursuant to Local Patent Rule (LPR) 2.3 for Case # 1:19-cv-05982-EEC, dated Nov. 25, 2019, 23 pages.
Exhibit II.C, Invalidity Claim Chart for JPR Series Jump Starters for Schumacher SL1 System for *Pilot, Inc.* v. *Schumacher Electric Corporation*, Defendant Schumacher Electric Corporation's Corrected Initial Noninfringement, Invalidity and unenforceability Contentions Pursuant to Local Patent Rule (LPR) 2.3 for Case # 1:19-cv-05982-EEC, dated Nov. 25, 2019, 29 pages.
Exhibit II.E, Invalidity Claim Chart for Projecta HP2200 for Schumacher SL1 System for *Pilot, Inc.* v. *Schumacher Electric Corporation*, Defendant Schumacher Electric Corporation's Corrected Initial Noninfringement, Invalidity and unenforceability Contentions Pursuant to Local Patent Rule (LPR) 2.3 for Case # 1:19-cv-05982-EEC, dated Nov. 25, 2019, 39 pages.
Exhibit II.F, Invalidity Claim Chart for Stanley System for *Pilot, Inc.* v. *Schumacher Electric Corporation*, Defendant Schumacher Electric Corporation's Corrected Initial Noninfringement, Invalidity and unenforceability Contentions Pursuant to Local Patent Rule (LPR) 2.3 for Case # 1:19-cv-05982-EEC, dated Nov. 25, 2019, 24 pages.
Exhibit II.G, Invalidity Claim Chart for U.S. Patent Publication No. US 2010/0173182 for *Pilot, Inc.* v. *Schumacher Electric Corporation*, Defendant Schumacher Electric Corporation's Corrected Initial Noninfringement, Invalidity and unenforceability Contentions Pursuant to Local Patent Rule (LPR) 2.3 for Case # 1:19-cv-05982-EEC, dated Nov. 25, 2019, 41 pages.
Exhibit II.H, Invalidity Claim Chart for US Patent Application Publication No. US 2009/0174362 for *Pilot, Inc.* v. *Schumacher Electric Corporation*, Defendant Schumacher Electric Corporation's Corrected Initial Noninfringement, Invalidity and unenforceability Contentions Pursuant to Local Patent Rule (LPR) 2.3 for Case # 1:19-cv-05982-EEC, dated Nov. 25, 2019, 36 pages.
Exhibit II.I, Invalidity Claim Chart for U.S. Pat. No. 7,345,450 for *Pilot, Inc.* v. *Schumacher Electric Corporation*, Defendant Schumacher Electric Corporation's Corrected Initial Noninfringement, Invalidity and unenforceability Contentions Pursuant to Local Patent Rule (LPR) 2.3 for Case # 1:19-cv-05982-EEC, dated Nov. 25, 2019, 41 pages.
Exhibit II.J, Invalidity Claim Chart for U.S. Pat. No. 6,426,606 for *Pilot, Inc.* v. *Schumacher Electric Corporation*, Defendant Schumacher Electric Corporation's Corrected Initial Noninfringement, Invalidity and unenforceability Contentions Pursuant to Local Patent Rule (LPR) 2.3 for Case # 1:19-cv-05982-EEC, dated Nov. 25, 2019, 81 pages.
Exhibit II.K, Invalidity Claim Chart for U.S. Pat. No. 6,803,743 for *Pilot, Inc.* v. *Schumacher Electric Corporation*, Defendant Schumacher Electric Corporation's Corrected Initial Noninfringement, Invalidity and unenforceability Contentions Pursuant to Local Patent Rule (LPR) 2.3 for Case # 1:19-cv-05982-EEC, dated Nov. 25, 2019, 23 pages.
Exhibit II.L, Invalidity Claim Chart for U.S. Patent Publication No. US 2014/0159509 for *Pilot, Inc.* v. *Schumacher Electric Corporation*, Defendant Schumacher Electric Corporation's Corrected Initial Noninfringement, Invalidity and unenforceability Contentions Pursuant to Local Patent Rule (LPR) 2.3 for Case # 1:19-cv-05982-EEC, dated Nov. 25, 2019, 35 pages.
Exhibit II.M, Invalidity Claim chart for German Utility Model Specification No. De 202013102599 U1 for *Pilot, Inc.* v. *Schumacher Electric Corporation*, Defendant Schumacher Electric Corporation's Corrected Initial Noninfringement, Invalidity and unenforceability Contentions Pursuant to Local Patent Rule (LPR) 2.3 for Case # 1:19-cv-05982-EEC, dated Nov. 25, 2019, 27 pages.
Exhibit II.N, Invalidity Claim chart for Japanese Laid-Open Publication No. JP2015-115979A for *Pilot, Inc.* v. *Schumacher Electric Corporation*, Defendant Schumacher Electric Corporation's Corrected Initial Noninfringement, Invalidity and unenforceability Contentions Pursuant to Local Patent Rule (LPR) 2.3 for Case # 1:19-cv-05982-EEC, dated Nov. 25, 2019, 39 pages.
Exhibit II.O, Invalidity Claim Chart for US Patent Application Publication No. US 2009/0174362 for *Pilot, Inc.* v. *Schumacher Electric Corporation*, Defendant Schumacher Electric Corporation's Corrected Initial Noninfringement, Invalidity and unenforceability Contentions Pursuant to Local Patent Rule (LPR) 2.3 for Case # 1:19-cv-05982-EEC, dated Nov. 25, 2019, 34 pages.
Exhibit II.Q, Invalidity Claim chart for U.S. Patent Publication No. US 2001/0038276 for *Pilot, Inc.* v. *Schumacher Electric Corporation*, Defendant Schumacher Electric Corporation's Corrected Initial Noninfringement, Invalidity and unenforceability Contentions Pursuant to Local Patent Rule (LPR) 2.3 for Case # 1:19-cv-05982-EEC, dated Nov. 25, 2019, 54 pages.
Exhibit II.D, Invalidity Claim Chart for U.S. Pat. No. 6,249,106 for *Pilot, Inc.* v. *Schumacher Electric Corporation*, Defendant Schumacher Electric Corporation's Corrected Initial Noninfringement, Invalidity and unenforceability Contentions Pursuant to Local Patent Rule (LPR) 2.3 for Case # 1:19-cv-05982-EEC, dated Nov. 25, 2019, 42 pages.
"Rescue® Portable Power Pack Instructions," Quick Cable Corporation, before 2014, 20 pages.
"Latest News—Projecta website," Brown & Watson International Pty Ltd., 2017, 5 pages.
"Powerall Portable Power Bank Battery Jump Starter LED Flashlight," Gryphon Mobile Electronics, LLC, date unknown, 9 pages.
"RFDPPJS2976DLX Portable Charge-All/Jump Starter User Manual," Rockford Consumer Products, date unknown.
"New Projecta Jump Starters Lift the Bar," Brown & Watson International Pty Ltd., Apr. 12, 2012, 2 pages.

(56) References Cited

OTHER PUBLICATIONS

Ward "Jumper Cables Avoid Surges," RV Life, May 1, 2011, 8 pages.
"MPower Jump User Manual," mPower Technologies, Inc., date unknown, 1 page.
Goodwin "PowerSafe jumper cables take danger out of playing with electricity," CBS Interactive Inc., Nov. 4, 2009, 6 pages.
"PowerSafe Jumper Cables SEMA Global Media Award Winner," Energy Safe Technologies, Inc., Feb. 24, 2009, 2 pages.
"Power Punch User Manual," axhess GmbH & Co. KG, 2013, 8 pages.
"JPR Series M version Mini Jump Start Product Datasheet," Asia Bright Industrial (H.K.) Co. Ltd., undated, 1 page.
"12VDC Mini Jump Start for JPR 4500P, JPR 2600P, JPR 1800P," axhess GmbH & Co. KG, 2012, 9 pages.
"Start-It® Jump 'n Charge™ User's Manual," Vector Manufacturing, 2006, 8 pages.
Edelstein "Lithium-Ion Batteries for Lighter, Compact Jump-Starting Pack," Green Car Reports, Apr. 26, 2014.
12VDC Mini Jump Start "Power Punch for JPR 9000P, JPR 4500P, JPR 4500 6V, JPR 2600P, JPR 1800P," axhess GmbH & jCo. KG, 2013, 25 pages.
"Juno Power announces the JUMPR external battery," Coolest Gadgets, Apr. 25, 2014, 2 pages.
"Rockford PP2976DLXA Portable Power Source—Mini Jump Starter," Amazon.com, date unknown, 14 pages.
"Smart Automatic Battery Charger Owner's Manual," Vector Manufacturing, Ltd., date unknown, 12 pages.
Murphy "Jump Start Your Car With Portable 'Jumpr' Device," PCMag, Apr. 25, 2014, 4 pages.
"JPR Series Jump Starter: JPR-1800M/2600M/4500M/9000M/9024M," BatteryFighter, 2014, 2 pages.
"MPower Jump Mini User Manual," mPower Technologies, Inc., date unknown, 1 page.
"Quicker, Easier, Better a Guide to the New Tools & Equipment Products Introduced at the SEMA Show," SEMA News, Aug. 2011, 4 pages.
"AAA Oregon Deploys PowerSafe Jump Start Systems," Energy Safe Technologies, Inc., Mar. 17, 2011, 2 pages.
"Product Review: Pocket Charger/Jump Starter," TexasBowhunter.com, Apr. 16, 2014, 6 pages.
Ramsey "Smartphone battery backup that will jump start your car," Verizon Media, Apr. 28, 2014, 5 pages.
"Startmonkey 400 Quik Start Guide," Powertraveller Limited, date unknown, 2 pages.
Moynihan "Small but Mighty Charger Juices Tablets and Jump-Starts Cars," Wired, Apr. 25, 2014, 9 pages.
"Lithium Starthilfe Booster Energiestation mit USB—Jump Starter JPR4500," Amazon.com, first available Jan. 26, 2013, 3 pages.
"450 Amp Jump-Starter With Compressor Instruction Manual," Baccus Global LLC, 2014, 10 pages.
"JPR 9000M Series Mini Jump Start Product Datasheet," Asia Bright Industrial (H.K.) Co. Ltd., as early as Apr. 22, 2013, 1 page.
Francisco "This power bank charges phones and jumpstarts cars," Yuga Tech, Apr. 25, 2014, 12 pages.
"Why PowerSafe Jumper Cables Are Necessary," Energy Safe Technologies, Inc., 2011, 2 pages.
"Profi Power Starthilfe Mini Jump JPR4500," Amazon.com, first available Jun. 4, 2013, 3 pages.
Crenshaw "Coming to SEMA: Fool-Proof Jumper Cables," RIDES, Oct. 28, 2010, 4 pages.
"Rescue® Portable Power Pack Model 2100 Product Specifications," QuickCable, as early as 28, 2014, 2 pages.
Cunningham "Three pocket-size jump starters," Road/Show by CNET, Apr. 28, 2014, 5 pages.
"DieHard Portable Power 950 Product Packaging," available before Apr. 28, 2014, 1 page.
"SHF12000-12 Instruction Sheet," Hangzhou Haijiu Battery Co. Ltd, prior to Dec. 13, 2013, 3 pages.
"Red Fuel™ Model: SL1 LithiumIon Jump Starter, Fuel Pack and Backup Power Owner's Manual," Schumacher Electric Corporation, date unknown, 28 pages.
"Function and jumpstart short cut Description," axhess GmbH & Co. Kg., date unknown, 1 page.
"Lithium-Ion Jump-Starter Instruction Mannual," Baccus Global LLC, 2011, 10 pages.
"LSTART Range 12V Compact Lithium-ion Jump Starts," Sealey, date unknown, 2 pages.
"DieHard Portable Power 950 Owner's Manual," Sears, Roebuck & Co., Dec. 2005, 8 pages.
"Redfuel™ SL65 Jump Starter Owner's Manual," Schumacher Electric Corporation, date unknown, 35 pages.
Battery Extender® Model BE01258 Lithium Ion Jump Starter, Fuel Pack and Backup Power Owner's Manual, Schumacher Electric Corporation, date unknown, 19 pages.
"Lithium Ion Jump Starter, Fuel Pack and Backup Power Owner's Manual," Schumacher Electric Corporation, date unknown, 7 pages.
"SL1316 Lithium Ion Jump Starter, Fuel Pack and Backup Power Owner's Manual," Schumacher Electric Corporation, date unknown, 32 pages.
"SL1315 Jump Starter/Power Pack Owner's Manual," Schumacher Electric Corporation, date unknown, 24 pages.
"SL1327 Jump Starter Owner's Manual," Schumacher Electric Corporation, date unknown, 35 pages.
"SL1317 Jump Starter Owner's Manual," Schumacher Electric Corporation, date unknown, 35 pages.
"SL1314 Jump Starter/Power Pack Owner's Manual," Schumacher Eletric Corporation, date unknown, 35 pages.
"SL1312 Jump Starter/Power Pack Owner's Manual," Schumacher Electric Corporation, date unknown, 35 pages.
"SL1338 Jump Starter/Power Pack Owner's Manual," Schumacher Electric Corporation, date unknown, 35 pages.
"SL1396 Power Pack Owner's Manual," Schumacher Electric Corporation, date unknown, 24 pages.
"SL1391U, SL1398U, SL1399U Lithium Ion Tactical Jump Starter Light Owner's Manual," Schumacher Electric Corporation, date unknown, 111 pages.
"SL1391, SL1398, SL1399 Lithium Ion Tactical Jump Starter Light Owner's Manual," Schumacher Electric Corporation, date unknown, 39 pages.
"3000A 12/24V High Cranking Sure Start Jumpstarter," Projecta, Oct. 2011, 12 pages.
"900 Peak Amp Jump-Starter Model No. PKC0AZ Owner's Manual and Warranty Information," Old World Industries, LLC, © 2014, 8 pages.
"HT75XX-1 100mA Low Power LDO," Holtek Semiconductor Inc., Jan. 12, 2006, Rev. 1.50, 14 pages.
"LM78XX/LM78XXA 3-Terminal 1A Positive Voltage Regulator," Fairchild Semiconductor Corporation, Mar. 2008, Rev. 1.0, 28 pages.
"Start-It Jump Starter 12 Volt DC Power Supply User's Manual & Warranty Information," Vector Manufacturing, © 2005, 6 pages.
Official Action for U.S. Appl. No. 14/569,352, dated Aug. 31, 2016, 8 pages.
Notice of Allowance for U.S. Appl. No. 14/569,352, dated Oct. 13, 2016, 7 pages.
Official Action for U.S. Appl. No. 15/355,409, dated Dec. 14, 2017 6 pages.
Official Action for U.S. Appl. No. 15/355,409, dated May 3, 2018 6 pages.
Notice of Allowance for U.S. Appl. No. 15/355,409, dated Jun. 21, 2018 7 pages.
Official Action for U.S. Appl. No. 15/923,219, dated Jan. 8, 2019 7 pages.
Notice of Allowance for U.S. Appl. No. 15/923,219, dated Apr. 5, 2019 8 pages.
Petition for Inter Partes Review of U.S. Pat. No. 9,525,297, filed Jan. 13, 2018 93 pages.
Decision Institution of Inter Partes Review for U.S. Pat. No. 9,525,297, dated Jul. 16, 2018, Case IPR2018-00488, 22 pages.
Order Granting Joint Motion to Terminate Proceeding and Granting Joint Request to Treat Settlement Agreement as Business Confi-

(56) References Cited

OTHER PUBLICATIONS dential Information for U.S. Pat. No. 9,525,297, dated Nov. 16, 2018, Case IPR2018-00488, 4 pages.
Declaration of Shukri Souri in Support of Petition for Inter Partes Review of U.S. Pat. No. 9,525,297, dated Jan. 13, 2018, 92 pages.
Curriculm Vitae of Dr. Shukri J. Souri, Jul. 2016, 4 pages.
"E-Power-21," Shenzhen Carku Technology Co., Ltd., Date Unknown, 1 page.
"Intelligent Jumper Cable," Shenzhen Carku Technology Co., Ltd., Date Unknown, 1 page.
"Jump Starter Instructions," Shenzhen Carku Technology Co., Ltd., Date Unknown, 1 page.
"Smart Jumper Cable," Shenzhen Carku Technology Co., Ltd., Date Unknown, 1 page.
"Summary of invalidity defenses against asserted claims of Pilot's U.S. Pat. No. 10,046,653," Date Unknown, 17 pages.
Bradford, "Re: Pilot Notice of Infringement (Amazon Case ID: 7131799991)," Jul. 9, 2020, 9 pages.
*Shenzhen Carku Technology Co., Ltd.* v. *The Noco Company*, Petition for Inter Partes Review for U.S. Pat. No. 9,007,015 with Exhibits 1001-1018, dated May 14, 2020, 1099 pages. Submitted in Two Parts.
*Pilot, Inc.* v. *Schumacher Electric Corporation*, Defendant Schumacher Electric Corporation's Corrected Initial Noninfringement, Invalidity and Unenforceability Contentions Pursuant to Local Patent Rule (LPR) 2.3 for Case # 1:19-cv-05982-EEC, dated Nov. 25, 2019, 84 pages.
Corrected Exhibit II.P, Invalidity Claim Chart for DieHard 950 System for *Pilot, Inc.* v. *Schumacher Electric Corporation*, Defendant Schumacher Electric Corporation's Corrected Initial Noninfringement, Invalidity and unenforceability Contentions Pursuant to Local Patent Rule (LPR) 2.3 for Case # 1:19-cv-05982-EEC, dated Nov. 25, 2019, 48 pages.

AUTOMOBILE CHARGER

RELATED APPLICATIONS

This application is a continuation of U.S. patent application Ser. No. 15/923,219, filed on Mar. 16, 2018 and entitled "Automobile Charger," now U.S. Pat. No. 10,328,806, issued on Jun. 25, 2019, which is a continuation of U.S. patent application Ser. No. 15/355,409, filed on Nov. 18, 2016 and entitled "Automobile Charger," now U.S. Pat. No. 10,046,653, issued on Aug. 14, 2018, which is a continuation of U.S. patent application Ser. No. 14/569,352, filed on Dec. 12, 2014 and entitled "Automobile Charger," now U.S. Pat. No. 9,525,297, issued on Dec. 20, 2016, which claims the benefit of priority of Chinese application no. 201420212173.5 filed on Apr. 28, 2014, the entire contents of all of which are incorporated herein by reference.

BACKGROUND

The present disclosure relates to an automobile charging device, in particular relates to a novel automobile charger with a safe power supply charging quickly.

Automobile charging is a big issue of traveling by automobile for those automobile fans and businessmen, the maturity of the technology thereof is one of the critical factors restricting the application of the automobile charger. However, current automobile chargers have common problems of not able to automatically detect whether a load is connected, whether an electrode is connected with an automobile storage battery reversely, whether an automobile engine or the storage battery has a reverse current, whether the battery state is suitable for heavy current power generation and so on. Accordingly, the present disclosure provides a novel automobile charger with the safe power supply charging quickly to solve the problems mentioned above, thus making the automobile charging safe, quick, mature and propagable.

SUMMARY

A purpose of the present disclosure aims to provide a novel automobile charger with the safe power supply charging quickly, in order to solve the problems presented in the above background.

To achieve the purpose described above, the present disclosure provides the following technical solutions: a novel automobile charger comprises a direct current power supply, wherein a positive pole of the direct current power supply is connected with one end of a DC to DC module, one end of a battery voltage detection module and one end of a load module simultaneously, while a negative pole of the direct current voltage is connected with the other end of the DC to DC module, one end of a micro controller, one end of an automobile start control module and the other end of the battery voltage detection module simultaneously. A third end of the DC to DC module is connected with the other end of the microcontroller, and the other three ends of the microcontroller are connected with the third end of the battery voltage detection module, the other end of the automobile start control module and one end of the load detection module respectively, wherein the other end of the load detection module is connected with the third end of the automobile start control module and the other end of the load module simultaneously; the load module which comprises the automobile storage battery and the automobile engine is located on the end of the load module.

As a further solution of the present disclosure that: the DC to DC module provides a stable voltage for the microcontroller which collects relevant data to conduct the corresponding control. The battery voltage detection module conducts the measurement of the batter voltage, the automobile start control module conducts the power supply or the power outage for the load module through the microcontroller, and the load detection module which comprises the automobile storage battery or the automobile engine detects whether the load module is correctly connected.

As a further solution of the present disclosure that: the circuit employs an electronic switch to supply power to the load module, which can offer more protection for the product, or reduce the product size and the material cost.

As a further solution of the present disclosure that: the battery voltage detection module provides protection for the power supply battery to prevent damages caused by the discharging of the direct current power supply.

As a further solution of the present disclosure that: the load detection module prevents improper operations of the user.

As a further solution of the present disclosure that: in the standby mode, the microcontroller closes all outputs when the voltage of the direct current power supply is lower than that of the state being able to supply power and then recovers when it is higher than that of the state being able to supply power.

As a further solution of the present disclosure that: the automobile start control module is the electronic switch.

Compared to the prior art, the present disclosure has the beneficial effects that:

1. The present disclosure employs the electronic switch to control the supply power for the load, this part can offer more protection for the product, and reduce the product size and the material cost.

2. The battery detection of the present disclosure can provide low voltage protection to prevent damages caused by the over discharging of the battery.

3. The load detection of the present disclosure can prevent improper operations by the user, such as reversed polarity, which causes damages to the automobile or the direct current power supply.

4. The present disclosure employs the voltage backflow protection for abnormal load, wherein the automobile start line is closed to protect the battery when the abnormal voltage is detected.

5. The present disclosure has a fast charging function, and can be installed fixedly or moved portably according to the use requirements of people.

6. The automatic detection module of the present disclosure can automatically detects whether the load is connected, whether the electrode is connected with the automobile storage battery reversely, whether the automobile engine or the storage battery has reverse current, whether the battery state is suitable for heavy current power generation, thereby protecting the load and the circuit and thus has complete functions.

In figures: 1—DC to DC module, 2—microcontroller, 3—battery voltage detection module, 4—automobile start control module, 5—load detection module, 6—load module, 7—direct current power supply.

DETAILED EMBODIMENTS

The technical solutions of the present disclosure will be described more clearly and fully in conjunction with drawings in the embodiments of the present disclosure, and obviously, the described embodiments are merely a part of the embodiments of the present disclosure, not all the embodiments. Based on the embodiments of the present disclosure, all the other embodiments obtained by the ordinary skilled in the art without creative labors belong to the scope claimed by the present disclosure.

Figure 1:
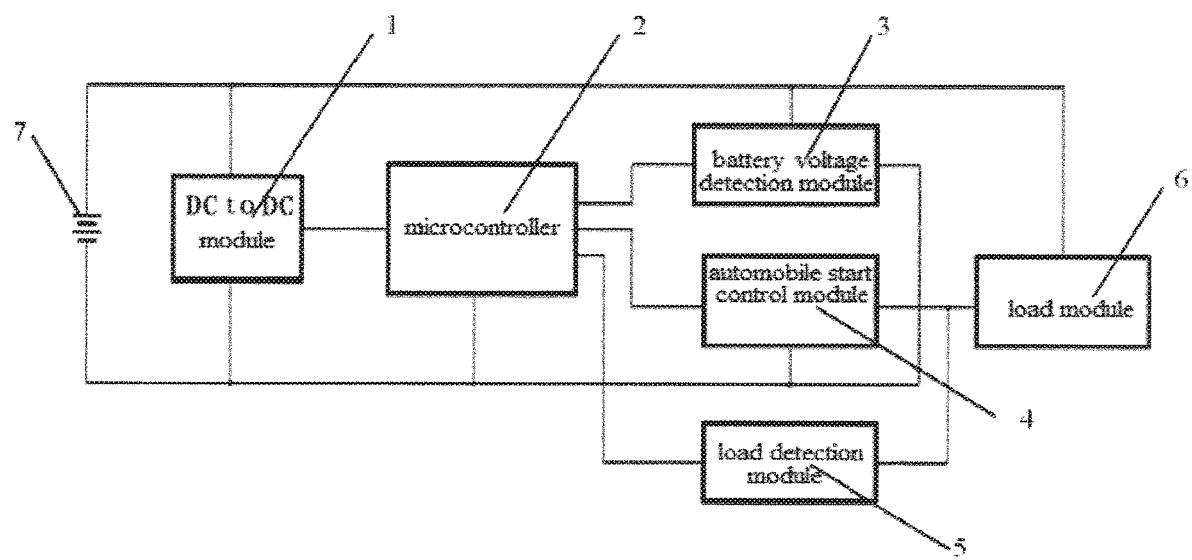
FIG. 1 is a block diagram for the principle of the emergency power supply of the safe intelligent automobile.

Refer to FIG. 1, a novel automobile charger comprises a direct current power supply, wherein the positive pole of the direct current power supply is connected with one end or lead of the DC to DC module, one end of the battery voltage detection module and one end of the load module simultaneously, while the negative pole of the direct current voltage is connected with the other end of the DC to DC module, one end of the microcontroller, one end of the automobile start control module and the other end of the battery voltage detection module simultaneously. A third end of the DC to DC module is connected with the other end of the microcontroller, and the other three ends of the microcontroller are connected with the third end of the battery voltage detection module, the other end of the automobile start control module and one end of the load detection module respectively, wherein the other end of the load detection module is connected with the third end of the automobile start control module and the other end of the load module simultaneously; the load module which comprises the automobile storage battery and the automobile engine is located on the end of the load module.

Figure 2:
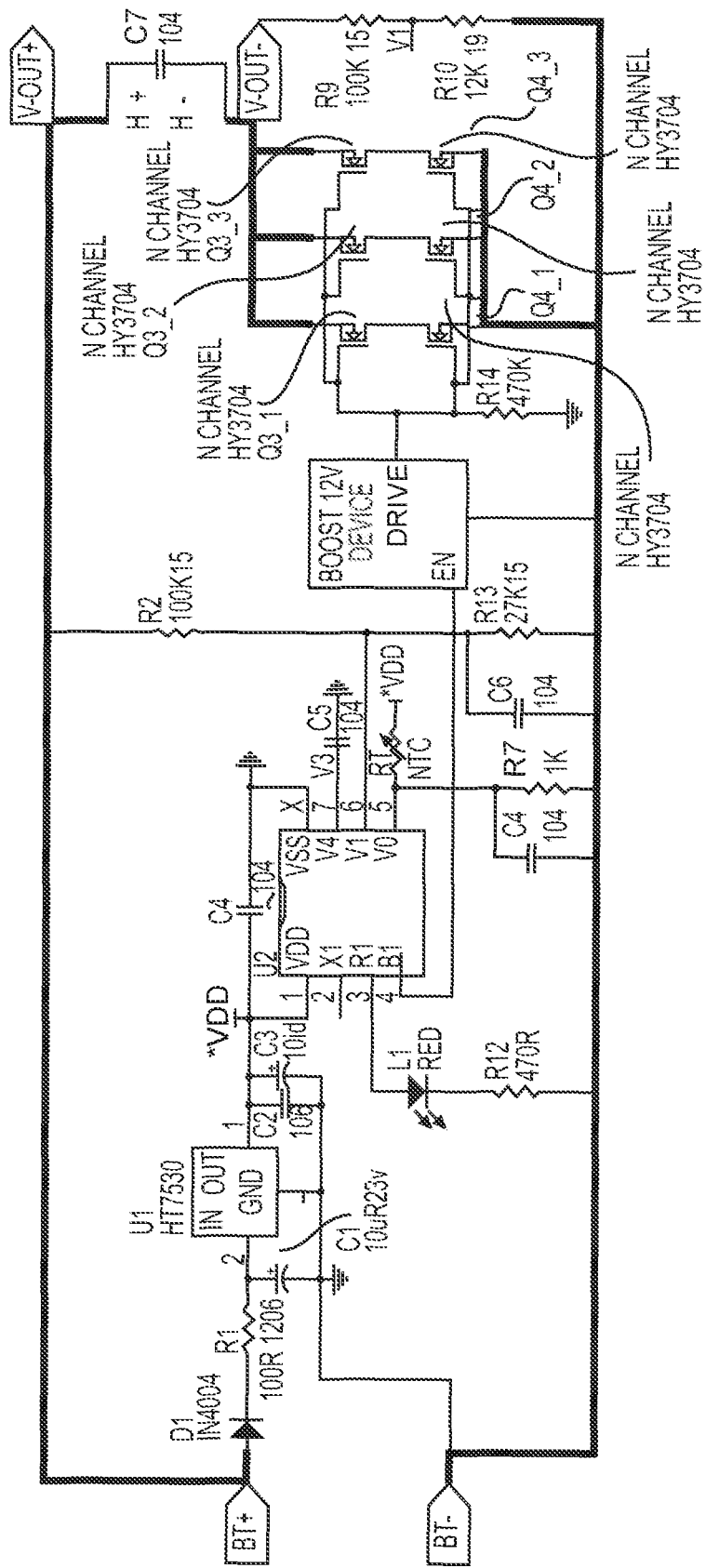
FIG. 2 is a circuit diagram for the emergency power supply of the safe intelligent automobile.

Refer to FIG. 2, the DC to DC module comprises a diode DE a resistor RE capacitor C1, a HT7530 voltage stabilizing tube, capacitors C2 and C3, wherein the positive pole of the diode D1 is connected with the positive pole of the battery, the negative pole of the diode D1 is connected with one end of the capacitor C1 and an IN port of the HT7530 voltage stabilizing tube simultaneously through the resistor RE and an OUT port of the HT7530 voltage stabilizing tube is connected with one end of the capacitor C2, one end of the capacitor C3 and a VDD port of the microcontroller U2, while the other end of the capacitor C1, the other end of the capacitor C2 and the other end of the capacitor C3 as well as a GND port of the HT7530 voltage stabilizing tube are grounded and connected with the negative pole of the battery simultaneously; a R1 port of the microcontroller U2 is connected with the negative pole of the battery through a light-emitting diode L1 and a resistor R12 which are in series connection, a B1 port of the microcontroller U2 is connected with a EN port of the automobile start control module, a V0 port of the microcontroller U2 is connected with the negative pole of the battery through a capacitor C4 and a resistor R7 which are in parallel connection, the V0 port is also connected with the VDD port through a slide rheostat RT, a V1 port of the microcontroller U2 is also connected with the negative pole of the battery through a resistor 10, a capacitor C6 and a resistor R13 which are in parallel connection, the V1 port is connected with the positive pole of the battery through a resistor R2, and is also connected with the negative pole of the automobile storage battery and the automobile engine simultaneously through a resistor R9, wherein two ends of the automobile storage battery are in parallel connection with the capacitor C7, resistors R9, 10, a capacitor C6 and a resistor R13 to form the load detection module together, a V4 port of the microcontroller U2 is grounded through a capacitor C5, a VSS port of the microcontroller U2 and one end of the capacitor C4 are grounded simultaneously. The other end of the capacitor C4 is connected with the VDD port of the microcontroller U2, the resistors R2, R13 and capacitor C6 form the battery voltage detection module together, and a Drive port of the automobile start control module is connected with the automobile engine and one end of a resistor R14 simultaneously, wherein the other end of the resistor R14 is grounded.

The EN port of the automobile start control module is positioned on a boost device, which provides a gate-source voltage to a plurality of N-channel MOSFETs Q3_1, Q3_2, Q3_3, Q4_1, Q4_2, Q4_3, which are connected in parallel pairs.

The DC to DC module in the present disclosure provides the stable voltage for the microcontroller which collects relevant data to conduct the corresponding control. The battery voltage detection module conducts the measurement of the batter voltage, and the automobile start control module conducts the power supply or the power outage for the load module through the microcontroller, wherein the load detection module detects whether the load module is correctly connected.

The microcontroller in the present disclosure determines whether the automobile storage battery is connected with the automobile engine through the load detection module, wherein the automobile start control model is automatically activated and the battery starts to supply power to the load module when the load is correctly connected; the automobile start control model is automatically deactivated and the battery stops supplying power to the load module when assuming that the load is not connected or the positive and negative polarities are reversely connected. In the standby mode, the microcontroller closes all outputs when the battery voltage is lower than 9V, and recovers the normal operation only when the battery voltage is larger than 10V; the automobile engine will generate the normal voltage to recharge the battery after the automobile starts, whereas the automobile start control module is deactivated immediately once the recharging voltage is larger than the voltage before that battery starts the power supply, to protect the battery from damages caused by charging with the normal voltage; the automobile start control module is the electronic switch, which can prevent the load from being reversely connected and recharging of the normal voltage, thus protecting the battery and prolonging lifespan.

The automobile engine will generate abnormal voltage to recharge the direct current power supply after the automobile starts, and the automobile start control module is deactivated immediately once the recharging voltage is larger than the voltage before the direct current power supply starts the power supply, to protect the direct current power supply from damages caused by charging with normal voltage charge.

It is obvious for the skilled people in the art that the present disclosure is not merely limited to the details of the above exemplary embodiments, and the present disclosure can be implemented in other specific forms without departing from the sprits or the basic features of the present disclosure. Thus, no matter to consider from which point of view, the embodiments should be considered as exemplary and non-limiting. The scope of the present disclosure is defined by the accompanying Claims rather than the above description, therefore it is intended that all the changes fallen within the meanings and scope of the equivalent elements of the Claims are contained in the present disclosure. Any drawing reference in the Claims should not be regarded as limiting the Claims involved.

Furthermore, it should be understood that although the specification is described according to the embodiments, but not every embodiment includes only an independent technical solution, this manner of description for the specification is only for clarity, therefore the skilled people in the art should take the Specification as a whole, and the technical solutions in various embodiments can be combined appropriately to form other implementations understandable for those skilled in the art.

What is claimed is:

1. A jumpstarter device comprising:
   a battery connected to a voltage regulator, the battery supplying power, via the voltage regulator, to a microcontroller;
   a load detector, connected to the microcontroller, to detect when the jumpstarter device is connected to an automobile battery;
   a battery voltage detector, connected to the microcontroller, to detect a battery voltage of the battery;
   the microcontroller generating, when the jumpstarter device is connected to the automobile battery, an output signal based on a detected battery voltage;
   switching circuitry including a plurality of MOSFETs to selectively connect a terminal of the battery to the automobile battery when the microcontroller generates the output signal, such that the battery supplies a charging current to the automobile battery; and
   a boost device for boosting a gate voltage of the plurality of MOSFETs.

2. The jumpstarter device of claim 1, wherein the voltage regulator comprising a voltage stabilizer connected to a resistor, a capacitor, and the microcontroller.

3. The jumpstarter device of claim 1, wherein the load detector comprises a resistor in parallel with a capacitor, the resistor and capacitor connected to the microcontroller.

4. The jumpstarter device of claim 1, wherein the microcontroller comprises a plurality of ports, the ports including a power supply port, a ground port, an output signal port, and a switching circuitry port.

5. The jumpstarter device of claim 1, wherein the switching circuitry is connected to the microcontroller via the boost device, and the plurality of MOSFETs are connected in parallel.

6. The jumpstarter device of claim 1, wherein the microcontroller:
   generates the output signal to cause the switching circuitry to connect the battery to the automobile battery when the automobile battery is properly connected and the detected battery voltage is above a threshold; and
   generates the output signal to cause the switching circuitry to disconnect the battery from the automobile battery when i) the detected battery voltage is below the threshold, or ii) the automobile battery is improperly connected.

7. The jumpstarter device of claim 1, wherein the microcontroller causes the switching circuitry to disconnect the battery from the automobile battery when the automobile battery has a higher voltage than the battery.

8. The jumpstarter device of claim 1, wherein the output signal causes the switching circuitry to disconnect the battery from the automobile battery to prevent recharging of the battery by the automobile battery.

9. The jumpstarter device of claim 1, wherein the voltage regulator is a direct-current to direct-current (DC-DC) converter.

10. The jumpstarter device of claim 1, wherein the load detector prevents improper user operation of the jumpstarter device.

11. The jumpstarter device of claim 1, wherein the load detector detects a reversed polarity condition.

12. The jumpstarter device of claim 1, wherein the load detector is connected to a negative terminal of the plurality of MOSFETs.

13. The jumpstarter device of claim 1, further comprising one or more light emitting diodes (LEDs) controlled by the microcontroller.

14. The jumpstarter device of claim 1, wherein a portion of the load detector is connected in parallel with the plurality of MOSFETs.

15. The jumpstarter device of claim 1, wherein the microcontroller causes the jumpstarter device to enter a standby mode when a voltage of the battery is less than 9V and allows operation when the voltage of the battery is greater than 10V.

16. A method for a device to charge an automobile battery, the method comprising:
   detecting a voltage level of a battery;
   detecting a connection and a type of connection between the battery and the automobile battery;
   generating, by a microcontroller, an output signal based on the voltage level of the battery, the connection to the automobile battery and the type of connection of the automobile battery;
   based on the output signal, selectively connecting the battery to the automobile battery by activating a plurality of MOSFETs; and
   based on the output signal, selectively disconnecting the battery from the automobile battery to prevent damages caused by over-discharging of the battery.

17. The method of claim 16, wherein a boost device boosts a gate voltage of the plurality of MOSFETs.

18. The method of claim 17, wherein:
   the type of connection of the automobile battery is a correct polarity connection or an incorrect polarity connection.

19. The method of claim 18, wherein the output signal:
   causes the plurality of MOSFETs to connect the battery to the automobile battery when the type of connection is a correct polarity connection and a voltage level of the battery is above a threshold; and
   cause the plurality of MOSFETs to disconnect the battery from the automobile battery when i) the level of the battery is below the threshold, or ii) the type of connection is an incorrect polarity connection.

20. A system for jumpstarting an automobile battery, the system comprising:
   means for detecting a voltage level of a battery;
   means for detecting whether a connection with the automobile battery is a correct polarity connection or an incorrect polarity connection;
   means for generating, by a microcontroller, an output signal based on the voltage level of the battery and whether the connection with the automobile battery is a correct polarity connection or an incorrect polarity connection;
   means for selectively enabling current to flow from the battery to the automobile battery based on the output signal; and a boost device for boosting a voltage associated with the means for selectively enabling current to flow from the battery to the automobile battery based on the output signal.

* * * * *